UNITED STATES PATENT OFFICE.

HERMANN PRINZHORN, OF CHICAGO, ILLINOIS, ASSIGNOR TO WILLIAM L. NEWMAN, OF SAME PLACE.

COMPOSITION OF MATTER FOR FUEL.

SPECIFICATION forming part of Letters Patent No. 352,889, dated November 16, 1886.

Application filed November 30, 1885. Serial No. 184,335. (No specimens.)

*To all whom it may concern:*

Be it known that I, HERMANN PRINZHORN, a subject of the Emperor of Germany, now a resident of the city of Chicago, in the county of Cook and State of Illinois, have invented a new and useful Composition of Matter for Fuel, of which the following is a specification.

My composition consists of the following ingredients combined, mixed, and prepared in the proportions and in the manner hereinafter stated, viz: Representing the quantity of charcoal, which is the principal constituent, by one hundred, the quantity of the other ingredients will be in the following proportions, varying according to the quality of the charcoal used: nitrate of sodium, nitrate of potassium or other soluble hyperoxide, two to three and a half; glue, dextrine, gum-arabic, or other adhesive material, three to five; clay, two to four; iron filings, two and one-half to six; water in such quantity that it will when mixed with the other ingredients form a cohesive dough.

The manner of preparing the compound is as follows: The charcoal is ground and sifted and thoroughly mixed with the solutions of the chemical salt, (nitrate of sodium, nitrate of potassium, or other soluble hyperoxide,) and the adhesive material (glue, dextrine, gum-arabic, &c.) above named. Adding water, with thorough stirring, a cohesive dough is formed. With this dough or mixture the clay and iron filings in proper proportion, varying, as above stated, are added and thoroughly mixed. The compound so produced should have sufficient consistency and cohesiveness to be pressed into any desired shape. After being pressed into the shape required the material is dried with or without the use of artificial heat, the time required for drying varying from twenty-four to thirty-six hours, according to the size of the shapes or pieces into which it is pressed.

This material, if properly mixed and made, will, in burning, be consumed to a white ash, burning without smoke and without the generation of noxious gases, and without the aid of any direct current of air or draft, thereby making it specially adapted and useful for the heating of street-cars, omnibuses, railway-coaches, and apartments.

Having described this invention, what I claim is—

The artificial fuel described, consisting of charcoal, nitrate of sodium, nitrate of potassium, or other soluble hyperoxide, glue, dextrine, gum-arabic, or other adhesive material, clay, and iron filings, substantially as specified.

HERMANN PRINZHORN.

Witnesses:
ADOLPH BALLENBERG,
LUTHER M. DEARBORN.